(12) United States Patent
Layton

(10) Patent No.: US 7,179,390 B1
(45) Date of Patent: Feb. 20, 2007

(54) METHOD OF FILTERING A FLUID AND REMOTE FILTERING STATION

(76) Inventor: George F Layton, 1220 8th Ave., Sebring, FL (US) 33875

( * ) Notice: Subject to any disclaimer, the term of this patent is extended or adjusted under 35 U.S.C. 154(b) by 0 days.

(21) Appl. No.: 11/037,514

(22) Filed: Jan. 18, 2005

(51) Int. Cl.
*B01D 37/00* (2006.01)

(52) U.S. Cl. .............. 210/767; 210/805; 210/168; 210/248; 210/416.5; 123/196 A; 184/1.5; 134/22.18

(58) Field of Classification Search .............. 210/168, 210/171, 196, 416.5
See application file for complete search history.

(56) References Cited

U.S. PATENT DOCUMENTS

| | | | | |
|---|---|---|---|---|
| 1,906,417 A | * | 5/1933 | Hartley et al. | 210/314 |
| 2,302,489 A | * | 11/1942 | Brown | 196/46.1 |
| 2,425,848 A | * | 8/1947 | Vawter | 210/167 |
| 2,443,875 A | * | 6/1948 | Spangenberger | 123/196 A |
| 2,499,705 A | * | 3/1950 | Vokes | 184/1.5 |
| 2,619,974 A | * | 12/1952 | Daley et al. | 134/56 R |
| 2,635,756 A | * | 4/1953 | Grieve et al. | 210/95 |
| 3,394,812 A | * | 7/1968 | Cohen et al. | 210/134 |
| 3,489,245 A | * | 1/1970 | Broadwell | 184/1.5 |
| 3,912,631 A | * | 10/1975 | Turman | 210/136 |
| 4,095,673 A | * | 6/1978 | Takeuchi | 184/1.5 |
| 4,114,650 A | * | 9/1978 | Gordon | 137/625.63 |
| 4,127,160 A | * | 11/1978 | Joffe | 165/95 |
| 4,161,979 A | * | 7/1979 | Stearns | 165/95 |
| 4,217,221 A | * | 8/1980 | Masso | 210/168 |
| 4,366,003 A | * | 12/1982 | Korte et al. | 134/18 |
| 4,390,049 A | * | 6/1983 | Albertson | 141/92 |
| 4,645,542 A | * | 2/1987 | Scharton et al. | 134/1 |
| 4,700,670 A | * | 10/1987 | Schade | 123/196 A |
| 4,790,882 A | * | 12/1988 | Barres | 134/22.18 |
| 4,791,890 A | * | 12/1988 | Miles et al. | 123/41.14 |
| 4,951,784 A | * | 8/1990 | Bedi | 184/1.5 |
| 4,971,704 A | * | 11/1990 | Johnson, Sr. | 210/741 |
| 5,039,406 A | * | 8/1991 | Whittington | 210/168 |
| 5,063,896 A | * | 11/1991 | Hyatt et al. | 123/198 A |
| 5,159,956 A | * | 11/1992 | Kurihara | 137/624.13 |
| 5,178,763 A | * | 1/1993 | Delaunay | 210/644 |
| 5,190,120 A | * | 3/1993 | Watts | 184/1.5 |
| 5,209,198 A | * | 5/1993 | Bedi | 123/196 R |
| 5,291,863 A | * | 3/1994 | Jones | 123/196 A |
| 5,318,080 A | * | 6/1994 | Viken | 141/98 |
| 5,327,862 A | * | 7/1994 | Bedi | 123/196 R |
| 5,370,160 A | * | 12/1994 | Parker | 141/98 |
| 5,372,219 A | * | 12/1994 | Peralta | 184/1.5 |

(Continued)

Primary Examiner—Robert James Popovics
Assistant Examiner—T. Woodruff
(74) Attorney, Agent, or Firm—Nixon & Vanderhye P.C.

(57) ABSTRACT

Filtering of an operating fluid of a mechanical device is performed utilizing a pumping device of the mechanical device which routinely circulated the operating fluid within the mechanical device. A remote filtering station of the present invention has a first conduit to contain the operating fluid during transfer from the mechanical device, a filter and a second conduit to contain the operating fluid during transfer back to the mechanical device. In the most preferred embodiment a filter replacement adapter is attached in place of the mechanical device's filter during the filtering procedure. The mechanical device is operated during the filtering procedure where the pumping device of the mechanical device circulates the operating fluid through the mechanical device and through the filter of the remote filtering station. This provides for a cleansing of all of the conduits of the mechanical device which routinely has the operating fluid circulated therethrough.

16 Claims, 10 Drawing Sheets

U.S. PATENT DOCUMENTS

| | | | |
|---|---|---|---|
| 5,383,481 A * | 1/1995 | Waelput | 134/56 R |
| 5,443,085 A * | 8/1995 | Huddas | 134/95.1 |
| 5,460,656 A * | 10/1995 | Waelput et al. | 134/10 |
| 5,467,746 A * | 11/1995 | Waelput et al. | 123/196 A |
| 5,586,435 A * | 12/1996 | Kokalis | 60/416 |
| 5,589,059 A * | 12/1996 | Semar | 210/109 |
| 5,615,695 A * | 4/1997 | Chambers | 134/102.1 |
| 5,674,323 A * | 10/1997 | Garcia | 134/1 |
| 5,680,877 A * | 10/1997 | Edstrand et al. | 134/103.1 |
| 5,699,817 A * | 12/1997 | Bankert et al. | 134/102.2 |
| 5,706,841 A * | 1/1998 | Werre et al. | 134/56 R |
| 5,772,871 A * | 6/1998 | Lyon et al. | 210/168 |
| 5,791,310 A * | 8/1998 | Grigorian et al. | 123/196 A |
| 5,813,382 A * | 9/1998 | Grigorian et al. | 123/196 R |
| 5,858,070 A * | 1/1999 | Halm et al. | 95/248 |
| 5,921,213 A * | 7/1999 | Grigorian et al. | 123/196 A |
| 5,951,857 A * | 9/1999 | Osborne | 210/168 |
| 5,957,240 A * | 9/1999 | Apostolides | 184/1.5 |
| 6,041,798 A * | 3/2000 | Grigorian et al. | 134/169 A |
| 6,071,355 A * | 6/2000 | Suratt | 134/21 |
| 6,089,205 A * | 7/2000 | Grigorian et al. | 123/196 A |
| 6,207,051 B1 * | 3/2001 | Anderson et al. | 210/237 |
| 6,213,133 B1 * | 4/2001 | Reicks | 134/22.1 |
| 6,223,790 B1 * | 5/2001 | Viken | 141/98 |
| 6,263,889 B1 * | 7/2001 | Flynn et al. | 134/102.2 |
| 6,302,167 B1 * | 10/2001 | Hollub | 141/98 |
| 6,378,657 B2 * | 4/2002 | Viken | 184/1.5 |
| 6,379,540 B2 * | 4/2002 | Reicks | 210/139 |
| 6,651,777 B2 * | 11/2003 | Suratt | 184/1.5 |
| 6,663,718 B1 * | 12/2003 | Mush | 134/1 |
| 6,692,260 B2 * | 2/2004 | Beck et al. | 434/374 |
| 6,752,159 B1 * | 6/2004 | Kavadeles et al. | 134/22.12 |
| 6,779,633 B2 * | 8/2004 | Viken | 184/1.5 |
| 6,923,190 B1 * | 8/2005 | Kavadeles et al. | 134/22.18 |
| 6,972,089 B2 * | 12/2005 | Leathers | 210/195.1 |
| 2003/0196956 A1 * | 10/2003 | Leathers | 210/650 |
| 2003/0201215 A1 * | 10/2003 | Evanovich et al. | 210/97 |
| 2004/0065347 A1 * | 4/2004 | Awad | 134/18 |
| 2004/0211626 A1 * | 10/2004 | Waelput | 184/1.5 |

* cited by examiner

METHOD OF FILTERING A FLUID AND REMOTE FILTERING STATION

BACKGROUND

1. Field of the Invention

Generally, the invention relates to methods and devices for detached filtering of an operating fluid of a machine where the operating fluid is diverted from the machine, filtered and returned to the machine. More specifically, the invention relates to such methods and devices which utilize a pumping device of the machine being serviced to move the operating fluid during the detached filtering procedure.

2. Description of the Prior Art

Contaminated operating fluid is one of the leading causes of component wear and failure in most types of mechanical equipment. All equipment manufactures recommend regular cleaning or changing of operating fluid. This is particularly true where the operating fluid is a hydraulic fluid.

Operating fluids of mechanical devices routinely become contaminated during operation of the respective mechanical device. Such contamination occurs from particulate material created during normal wear of components of the mechanical device. Such contamination also often occurs from external particulate material which enters the mechanical device during operation of the mechanical device. Particulate material, if left in the operating fluid, can cause wear to various parts of the mechanical device. Contamination of operating fluids of mechanical devices also occurs from introduction of a fluid having a different composition than the respective operating fluid into the operating fluid. Many different fluids may cause such contamination of an operating fluid including operating fluids of a different composition and water.

Mechanical devices which use an operating fluids will typically have a pumping device to circulate the operating fluid during operation of the mechanical device. Often this circulation will involve movement within a transfer conduit. It is routinely known in the art to position a filter in communication with the transfer conduit. This provides for the operating fluid to be diverted from the transfer conduit and into the filter, through a filter material, and back into the transfer conduit. The filter material of the filter acts to trap at least certain particulate matter from the operating fluid and thus remove that particulate matter trapped by the filter material from the operating fluid being circulated.

Numerous methods exist to filter an operating fluid of a mechanical device. Examples of operating fluids which may be subject to filtering include hydraulic fluids, lubricating oils, drive fluids and cooling fluids.

Many varied compositions of fluids are known for use as hydraulic fluids. Such hydraulic fluids are moved through a conduit under pressure to power movement of a component. Examples of such components which are powered to move based upon the pressure of the hydraulic fluid include extending and/or retracting cylinders, motors which produce rotational output and various switches, amongst others.

Many varied compositions of fluids are known for use as lubricating oils. Many of these are based upon a petroleum derivative. Such lubricating oils are typically used to reduce friction between contacting components where movement routinely occurs between the contacting components during operation of the mechanical device.

Many varied compositions of fluids are known for use as drive fluids, such as used in automatic transmissions. Such fluids typically act as a separator between components where a first component is powered to rotate and the drive fluid transfers the rotation of the first component to a second component. This arrangement provides for the two (2) components to have different rotational speed at some particular moment while the first component's power is still transferred to the second component.

Many varied compositions of fluids are known for use as cooling fluids. Such cooling fluids typically are circulated about a machine in various conduits while extracting heat from the machine for external cooling of the fluid. Typically, the circulation of the cooling fluid will include passage through a radiator type device where heat from the cooling fluid is dispersed external from the machine. It is known to provide mechanical arrangements where hydraulic fluids, lubricating fluids and drive fluids also perform a secondary function as a medium for extraction of heat from the fluid or from the mechanical components which the fluid comes into contact with.

It is known in the art to provide periodic maintenance on mechanical devices which use an operating fluid where the operating fluid is cleaned or replaced. The most common conventionally known method for providing this periodic maintenance is referred to as changing the fluid. This procedure typically involves removing at least the majority of the existing operating fluid from the mechanical device, removing the existing filter, installing an unused filter and installing new fresh operating fluid. During this changing procedure of the operating fluid the mechanical device normally will not be operating. A drain plug often will be positioned at a lower extremity of the operating fluid containment area and is removed to allow gravity discharge of the operating fluid from the mechanical device. The drain plug is typically left out until the flow of operating fluid slows to a drip. During this period, the used filter normally is removed and replaced with a new filter. Then the drain plug is replaced and new, or reconditioned, operating fluid is installed in the mechanical device. When this process is utilized it results in some of the old operating fluid to remain in the mechanical device. Additionally, the removed used operating fluid must be discarded in some acceptable manner.

It is known to provide an operating fluid draining device having a probe and an external pump. The probe is inserted into the mechanical device, typically through a dip stick conduit, to a lower extremity of the operating fluid of the mechanical device. Then the external pump is operated to drain the operating fluid. During the maintenance operation the filter is replaced and new or reconditioned operating fluid is installed. Various of these devices provide external filtering of the operating fluid with return of the filtered operating fluid to the mechanical device. Certain of these devices are known for periodic maintenance of hydraulic fluid.

In the field of mechanical devices which utilize a hydraulic fluid to power movement of components, typically a plurality of hydraulic units will exist which may be selectively operated by an operator. These hydraulic units may perform various useful functions. Examples of such hydraulic units include cylinders which may be extended and/or retracted under power and motors which produce rotational output. A problem which exists with providing periodic maintenance on the hydraulic fluid is that hydraulic fluid resides in the hydraulic units and in conduits leading to and from them beyond valves which control the respective hydraulic units. Conventional periodic maintenance of such mechanical devices typically drain and replace the hydraulic fluid existing in the reservoir tank, leaving a quantity of old fluid within the various conduits and various hydraulic units.

This produces a maintenance cycle which is less thorough than desired. Additionally, hydraulic fluid, depending upon the particular composition of the fluid, is quite expensive to replace during changing procedures. This produces considerable expensive to fleet administrators when applied to a fleet of machines or vehicles. Another issue of great concern is the transport and disposal of used and/or contaminated hydraulic fluid. Hydraulic fluid, whether new, reconditioned or used, must be handled with great care due to the significant environmental impact which may result from improper handling or improper disposal. Certain types of equipment may be deployed as a part of their respective function away from a central maintenance facility. This requires either transporting the equipment to a maintenance facility or performing the periodic maintenance 'in the field' where the equipment is deployed. Transport of the equipment for such periodic maintenance may involve considerable expense, considerable man hours and considerable down time for the equipment. Performing periodic maintenance 'in the field' where the equipment is deployed using conventionally known methods may involve considerable risk of leakage or spilling of hydraulic fluid which potentially may damage the environment. When conventional changing of the hydraulic fluid occurs 'in the field' clean hydraulic fluid must be transported to the site and the old used hydraulic fluid must be transported from the site. Transport of hydraulic fluids pose obvious risks including from highway accidents involving the transport vehicle. Various governmental restrictions typically exist to regulate the driver of vehicles transporting even generally small quantities, such as even a single fifty-five (55) gallon drum, of hydraulic fluid, whether new, reconditioned or used. Additionally, often special requirements exist for the transport vehicle such as display of placards indicating that the vehicle is transporting hazardous materials.

Various deficiencies exist with each of the known methods of providing periodic maintenance of operating fluids in mechanical devices. As can be seen various attempts have been made to provide ready easy periodic maintenance of operating fluids in mechanical devices. These attempts have been less efficient than desired. As such, it may be appreciated that there continues to be a need for a filtering method which filters the operating fluid of a mechanical device to a desired level of purity while utilizing the pumping device of the mechanical device with return of the filtered operating fluid to the mechanical device. This arrangement provides for a flushing of the conduits which the operating fluid typically is pumped through by the pumping device of the mechanical device. The present invention substantially fulfills these needs.

SUMMARY

In view of the foregoing disadvantages inherent in the known types of providing periodic maintenance of operating fluids in mechanical devices, your applicant has devised a method of filtering an operating fluid contained in a mechanical device. The mechanical device will have a pumping device which routinely provides for a movement of the operating fluid about the mechanical device. The routine movement of the operating fluid taking place at least partially within a transfer conduit of the mechanical device. The method of filtering utilizes the pumping device of the mechanical device for movement of the operating fluid during the filtering procedure. The method of filtering the operating fluid contained in the mechanical device uses the following steps. Providing a remote filtering station having a filter, a first conduit for fluid transfer from the mechanical device to the filter and a second conduit for fluid transfer from the filter to the mechanical device. Connecting the provided first conduit relative to the transfer conduit of the mechanical device for the fluid transfer of the operating fluid from the transfer conduit of the mechanical device to the first conduit. Connecting the provided second conduit relative to the transfer conduit of the mechanical device downstream of the connection of the provided first conduit to the transfer conduit of the mechanical device for the fluid transfer of the operating fluid from the provided second conduit to the transfer conduit of the mechanical device. Operating the pumping device of the mechanical device to move the operating fluid through the transfer conduit of the mechanical device and into the provided first conduit and through the filter of the provided remote filtering station and through the provided second conduit and into the transfer conduit of the mechanical device. Disconnecting the provided first conduit from the transfer conduit of the mechanical device. Disconnecting the provided second conduit from the transfer conduit of the mechanical device.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a periodic maintenance filtering of an operating fluid of a mechanical device where the mechanical device is operated during at least a portion of the filtering procedure with return of the filtered operating fluid to the mechanical device.

Other objects include;

a) to provide for a periodic maintenance filtering of a hydraulic fluid of a mechanical device.

b) to provide for the periodic maintenance filtering of the hydraulic fluid with operation of all hydraulic units of the mechanical device during the filtering procedure where generally all of the hydraulic fluid of the mechanical device is passed through a filter of a remote filtering station.

c) to provide for the periodic maintenance of the operating fluid of the mechanical device to use a pumping device of the mechanical device to move the operating fluid.

d) to provide for a filter replacement adapter to take the place of an existing filter of the mechanical device during the filtering procedure.

e) to provide for the filter replacement adapter to have a first conduit to contain the operating fluid being pumped out of the mechanical device by the pumping device of the mechanical device during transfer of the operating fluid to a remote filtering station.

f) to provide for the filter replacement adapter to have a second conduit to contain the operating fluid being pumped through the remote filtering station by the pumping device of the mechanical device during transfer of the operating fluid back to the mechanical device.

g) to provide for the filter replacement adapter to have an outer portion which remains generally axially stationary during installation of the filter replacement adapter on the mechanical device and an inner, or tightening, portion which penetrates the outer portion and which is rotated during installation of the filter replacement adapter on the mechanical device.

h) to provide for a pressure gauge on the remote filtering station to permit monitoring of a fluid pressure of the operating fluid being delivered to the remote filtering station.

i) to provide for a flow gauge on the remote filtering station to permit monitoring of a flow rate of the operating fluid passing through the remote filtering station.

j) to provide for a fluid release valve on the remote filtering station to permit withdrawal of a sample of the operating fluid downstream of a filter of the remote filtering station.

k) to provide for a second filter on the remote filtering station to permit additional filtering of the operating fluid passing through the remote filtering station.

l) to provide for the second filter of the remote filtering station to have characteristics which permit filtering of the operating fluid where the filtering qualities of the second filter of the remote filtering station are different from the filtering qualities of the first filter of the remote filtering station.

m) to provide for the first filter of the remote filtering station to have filtering qualities which remove particulate material from the operating fluid and for the second filter of the remote filtering station to have filtering qualities which remove specific compositions of matter, such as water, from the operating fluid.

n) to provide for filtering of operating fluid during a periodic maintenance procedure wherein the existing operating fluid is returned to a nearly new condition and remains in the mechanical device thereby eliminating the requirement of disposing of the existing operating fluid as exists with conventional changing of the operating fluid during a periodic maintenance procedure.

o) to provide for the periodic maintenance to return the operating fluid of the mechanical device to the nearly new condition to occur at any desired physical location including at the location of deployment of the mechanical device on a work site.

p) to provide for an elimination of transport of hazardous operating fluids from a location of acquisition of new, or reconditioned, operating fluid and to a location of disposal of used operating fluid as is required with changing of the operating fluid during conventional periodic maintenance procedures.

q) to provide for the filter replacement adapter to have two conduits extending therefrom, with respective quick connect/release fittings thereon, wherein the connection of conduits to the filter replacement adapter from a filter housing unit to the extending conduits of the filter replacement adapter may occur at a convenient location beyond the perimeter of obstructing structures of the mechanical device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1b is an elevational view of the remote filtering station depicted in FIG. 1a.

DESCRIPTION

Figure 1B:
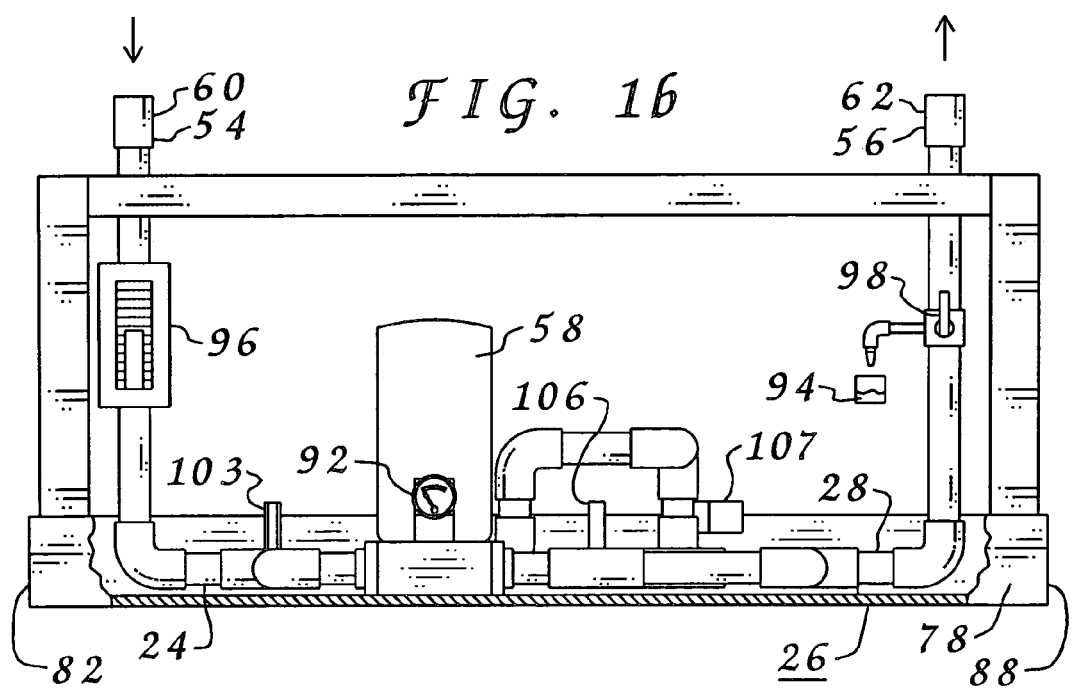

Many different methods and devices having features of the present invention are possible. The following description describes the preferred embodiment of select features of those methods and devices and various combinations thereof. These features may be deployed in various combinations to arrive at various desired working configurations of methods and devices.

Reference is hereafter made to the drawings where like reference numerals refer to like parts throughout the various views.

The term operating fluid as used herein refers to any fluid, having any composition of matter, which performs some desired function in use with a machine. Such functions include as a hydraulic fluid to transfer power under pressure, as a lubricating fluid to reduce friction between components, as a drive fluid to transfer power from one component to another component and as a cooling fluid to extract heat from a component or components.

The term mechanical device as used herein refers to any mechanical device which routinely uses an operating fluid to perform some desired function with, or for, the mechanical device. The mechanical device may be an entire machine or may be merely a portion of the entire machine. The mechanical device may be stationarily positioned where it does not move from an installed location during routine operation of the mechanical device. Alternatively, the mechanical device may be a vehicle, or attached to a vehicle, which moves about. The mechanical device may be on a transport vehicle which moves about while the mechanical device only operates while the transport vehicle is stationary. The mechanical device may have a single general component, or component set, which the operating fluid acts with or upon. Alternatively, the mechanical device may have a plurality of components which the operating fluid acts with or upon. In the case where the operating fluid is a hydraulic fluid the mechanical device may have many hydraulic units which may be selectively operated utilizing power delivered through pressure of the hydraulic fluid.

The term conduit refers to containment passageways and is not limited to any structural member or class of structural members, such as a hose member or tubular member. Additionally, the term conduit is not limited to a single type or material for the containment passageway(s) of the conduit, but may, if desired, be a mixture of different types of materials. The term conduit is also not limited to a single configuration of containment passageway throughout the conduit. The term transfer conduit, as applied to mechanical devices, may have many types of containment structures and may branch off into many separate and distinct conduits or may combine from many separate and distinct conduits into a single conduit. Preferably, all of the operating fluid being circulated by the mechanical device during performance of the filtering procedure of the present invention will pass through the transfer conduit of the mechanical device at the point of diversion to the filter of the remote filtering station so that all of the operating fluid has an opportunity to be filtered by the filter of the remote filtering station of the present invention.

It is understood that the mechanical device, and all components of the mechanical device including the operating fluid, upon which a filtering procedure based upon the present invention is being performed are workpieces and form no part of any structure of the present invention. Certain of these structures of the mechanical device will be manipulated as part of a step of a method of the present invention while others may be so manipulated as part of a step of a method of the present invention.

The mechanical device upon which the method of filtering of an operating fluid will be performed will have a pumping device and a transfer conduit. The pumping device will provide for a movement of the operating fluid about the mechanical device at least partially within the transfer conduit. Depending upon the function of the mechanical device and the function of the operating fluid the mechanical device may have a hydraulic unit capable of being operated through a range of motion in response to movement of the operating fluid, in the form of hydraulic fluid, through the transfer conduit utilizing the pumping device. Depending upon the configuration of the mechanical device the mechanical device may have a filter bracket in communication with the transfer conduit and a filter connected to the filter bracket. Certain mechanical devices utilize hydraulic units to drive wheels for movement of the mechanical device. When such is the case, the remote filtering station may be entirely placed upon the mechanical device where the mechanical device may operate those hydraulic units which provide propulsion and therefore move the mechanical device about during at least a portion of the filtering procedure.

Figure 7A:
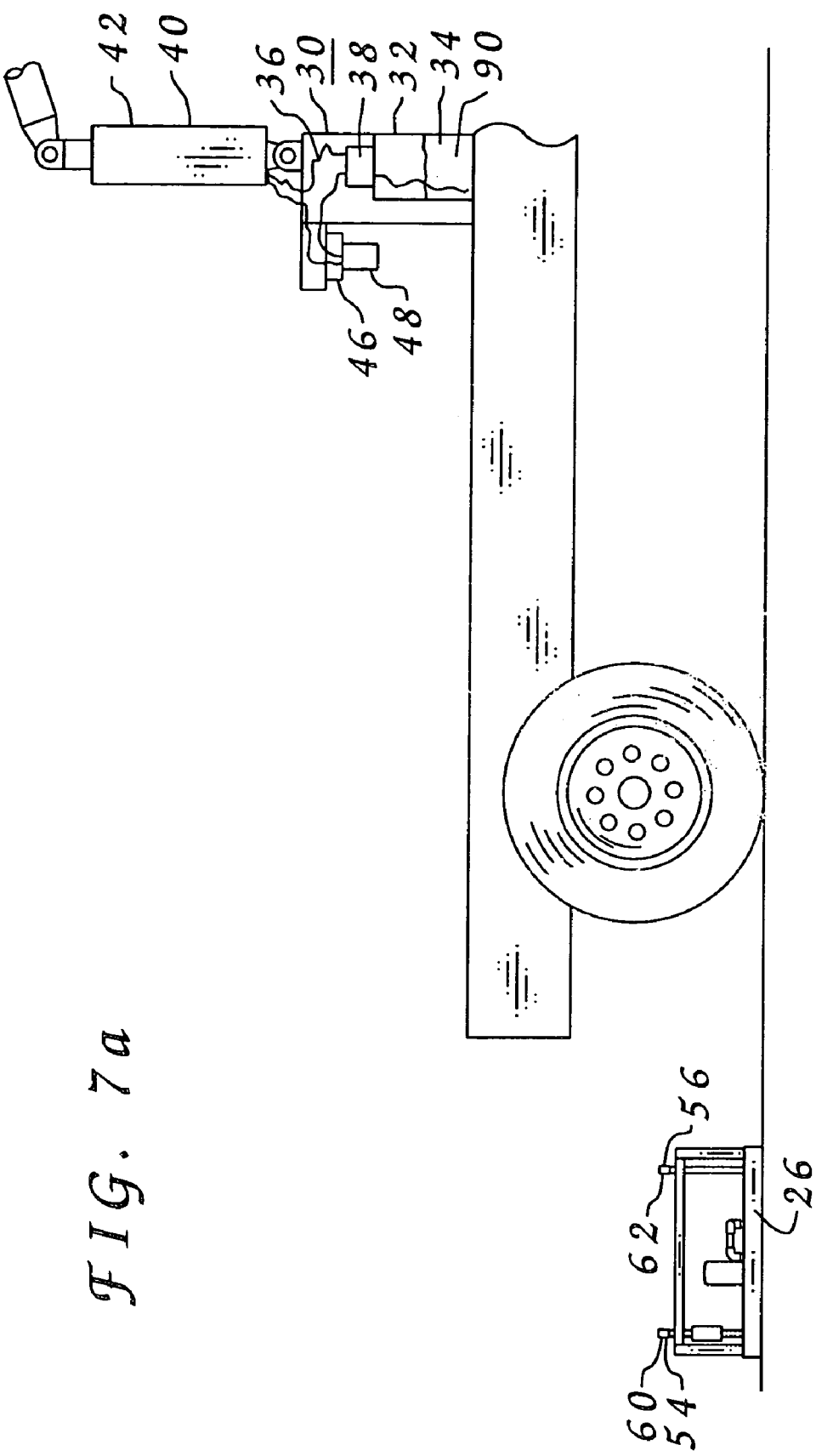
FIG. 7a through FIG. 7d are elevational views of the filtering station and a portion of a mechanical device in various stages during a filtering procedure.
Figure 7B:
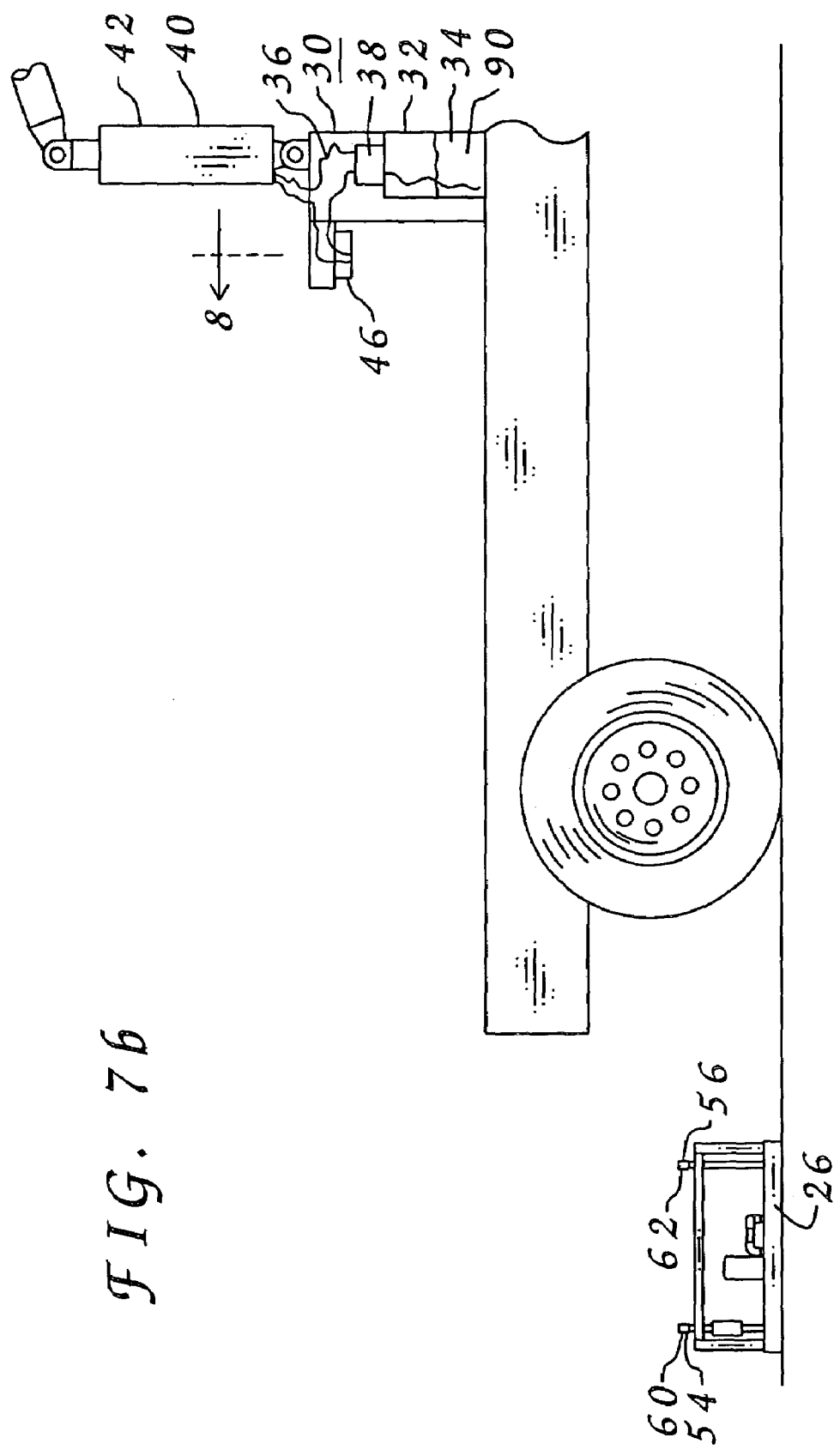
Figure 7C:
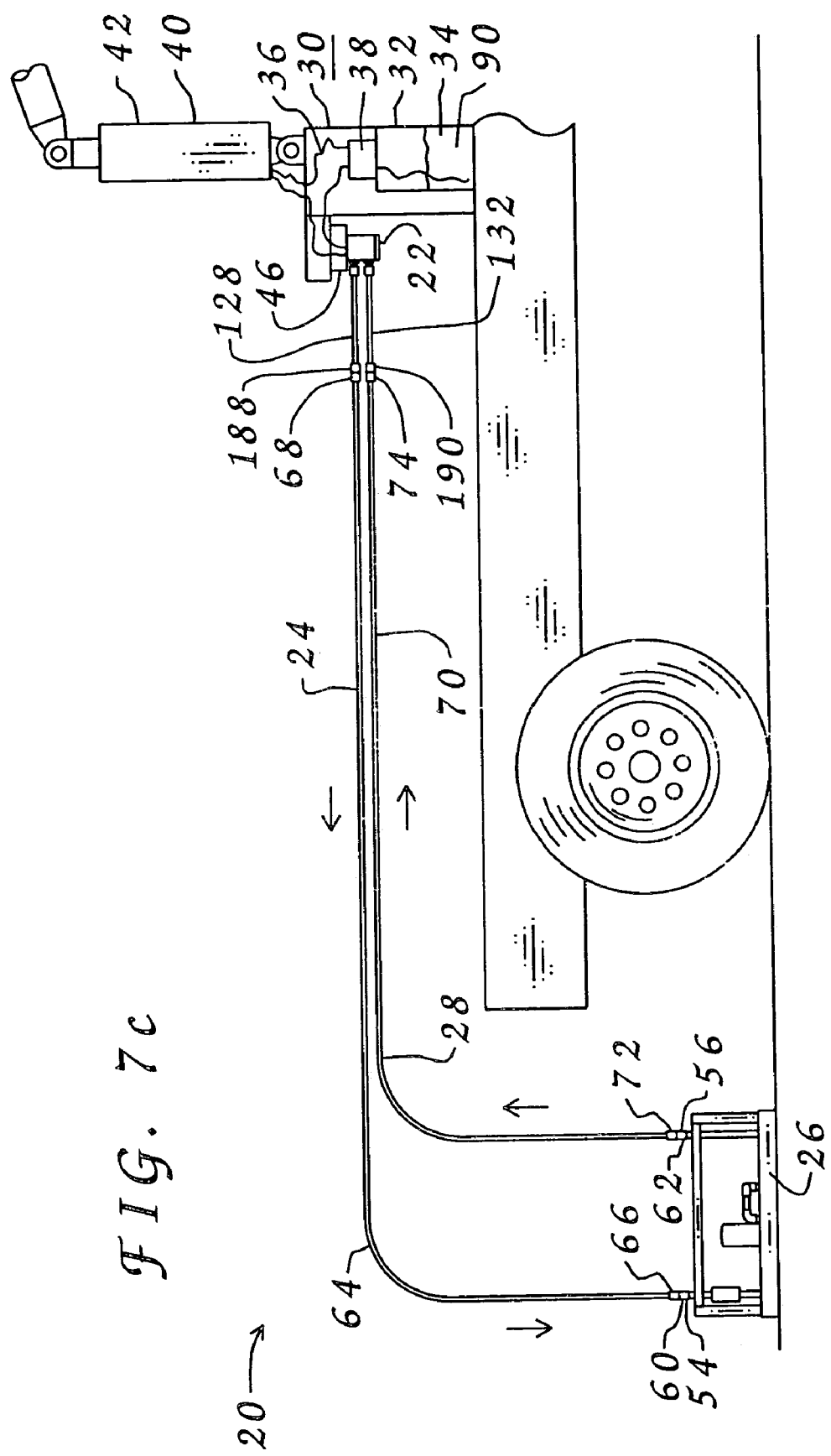
Figure 7D:
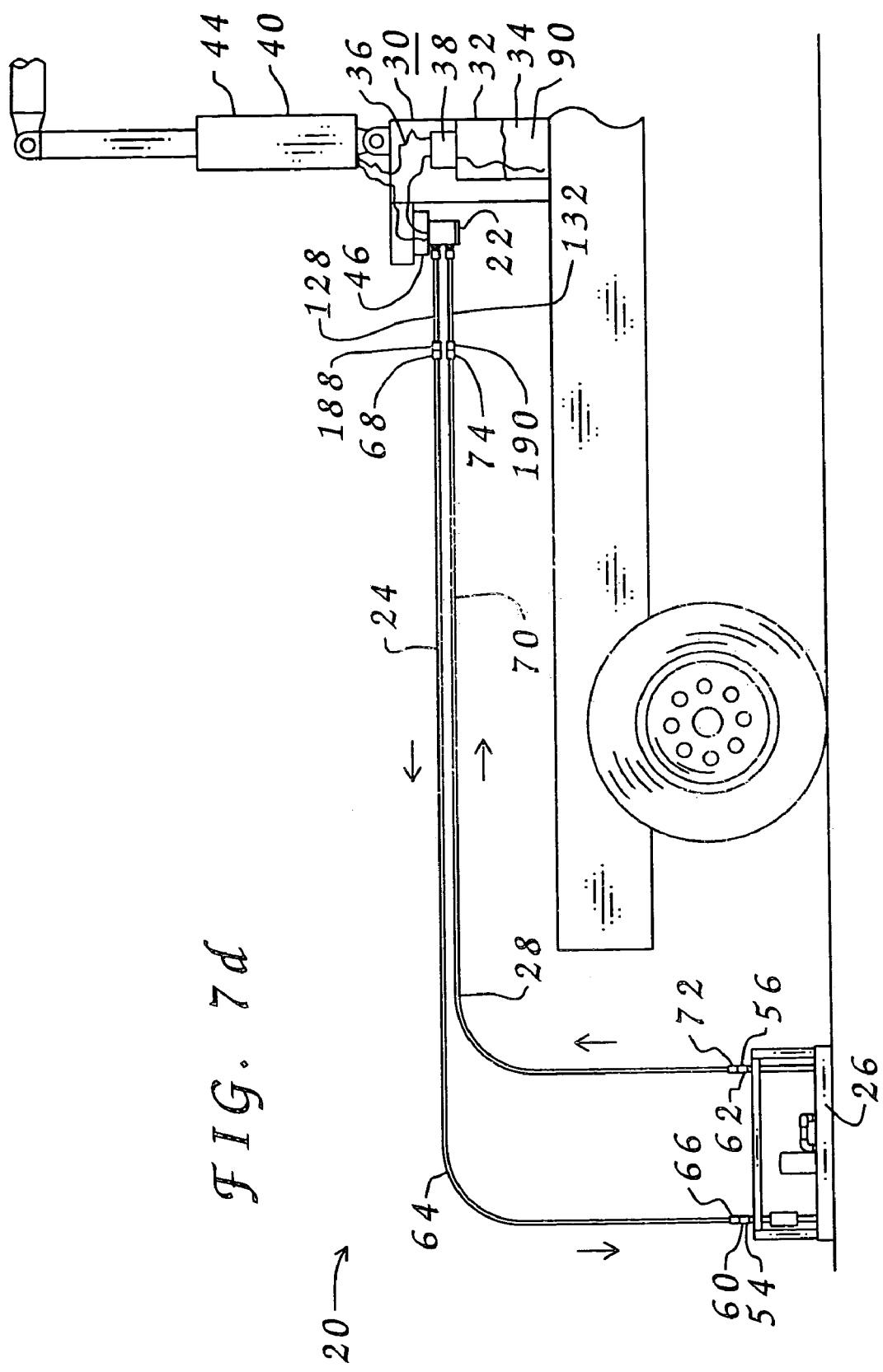

The specific reference to the drawings utilize a remote filtering station 20, see FIG. 7c and FIG. 7d, having a filter replacement adapter 22, a first conduit 24, a filter housing unit 26 and a second conduit 28. Remote filtering station 20 is depicted operating on a mechanical device 30, see FIG. 7a through FIG. 7d, having a reservoir 32 containing a hydraulic fluid 34 as the applicable operating fluid. Those of ordinary skill in the art may make use of the description contained herein to practice the method upon any applicable mechanical device having an operating fluid.

Figure 8:
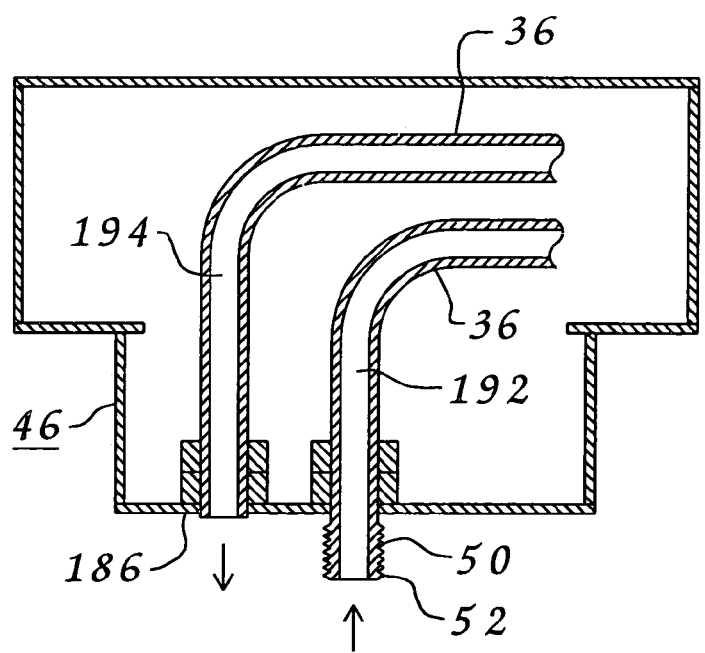
FIG. 8 is a sectional view of a portion of a filter bracket of the mechanical device as taken from the section line '8' in FIG. 7b.

The method of filtering will be performed on mechanical device 30. Mechanical device 30 has a transfer conduit 36 having hydraulic fluid 34 contained therein. A pumping device 38 provides for movement of the hydraulic fluid within transfer conduit 36 under pressure. A hydraulic unit 40 is capable of being operated through a range of motion between a retracted position 42, see FIG. 7c, and an extended position 44, see FIG. 7d, in response to power delivered through transfer conduit 36 from pumping device 38. A filter bracket 46 is positioned within transfer conduit 36 and routinely has a filter 48 attached thereto, see FIG. 7a. Filter 48 has internal threads, not shown, about an aperture as conventionally known in the art. Filter bracket 46 has a filter mounting shaft 50, see FIG. 8, which has external threads 52 thereon which mates with the internal threads of filter 48 to retain filter 48 securely to filter bracket 46.

Various of the views depict remote filtering station 20, or portions thereof, to provide for a maintenance filtering of hydraulic fluid 34 of mechanical device 30. Various of the components of the invention are described separately but, if applicable, all provided components, excluding the workpieces, may be considered to be part of remote filtering station 20. Filter housing unit 26 has a first coupling 54, a second coupling 56 and a first filter 58. First coupling 54 and second coupling 56 are depicted as extending beyond an upper perimeter of filter housing unit 26 for clarity of understanding in the various views. In actual practice first coupling 54 and second coupling 56 would preferably be contained within filter housing unit 26 for protection during transport, storage and use. First coupling 54 has a quick connect/release fitting 60 and second coupling 56 has a quick connect/release fitting 62. FIG. 7c and FIG. 7d depict first conduit 24 for fluid containment during transfer from filter replacement adapter 22 to filter housing unit 26. First conduit 24 provides for containing hydraulic fluid 34 during transit from mechanical device 30 during operation of pumping device 38 of mechanical device 30 into filter housing unit 26 during the maintenance filtering of hydraulic fluid 34. A portion of first conduit 24 is depicted as a first extension hose 64 and has a first quick connect/release fitting 66 and a second quick connect/release fitting 68 at opposing ends thereof for ready attachment and detachment. First quick connect/release fitting 66 of first extension hose 64 connects to quick connect/release fitting 60 of first coupling 54 of filter housing unit 26. Second conduit 28 provides for containing hydraulic fluid 34 during transfer from filter housing unit 26 to filter replacement adapter 22. Second conduit 28 provides for containing hydraulic fluid 34 during transit to mechanical device 30 during operation of pumping device 38 of mechanical device 30 from filter housing unit 26 during the maintenance filtering of hydraulic fluid 34. A portion of second conduit 28 is depicted as a second extension hose 70 and has a first quick connect/release fitting 72 and a second quick connect/release fitting 74 at opposing ends thereof for ready attachment and detachment. First quick connect/release fitting 72 of second extension hose 70 connects to quick connect/release fitting 62 of second coupling 56 of filter housing unit 26. First conduit 24 is considered to be all conduit leading to first filter 58 of filter housing unit 26. Second conduit 28 is considered to be all conduit beyond first filter 58 or beyond first filter 58 and a second filter 76 when second filter 76 is present. While couplings 54 and 56 are desirable for ease of manipulation, storage and transport of filter housing unit 26 they are optional.

Figure 1A:
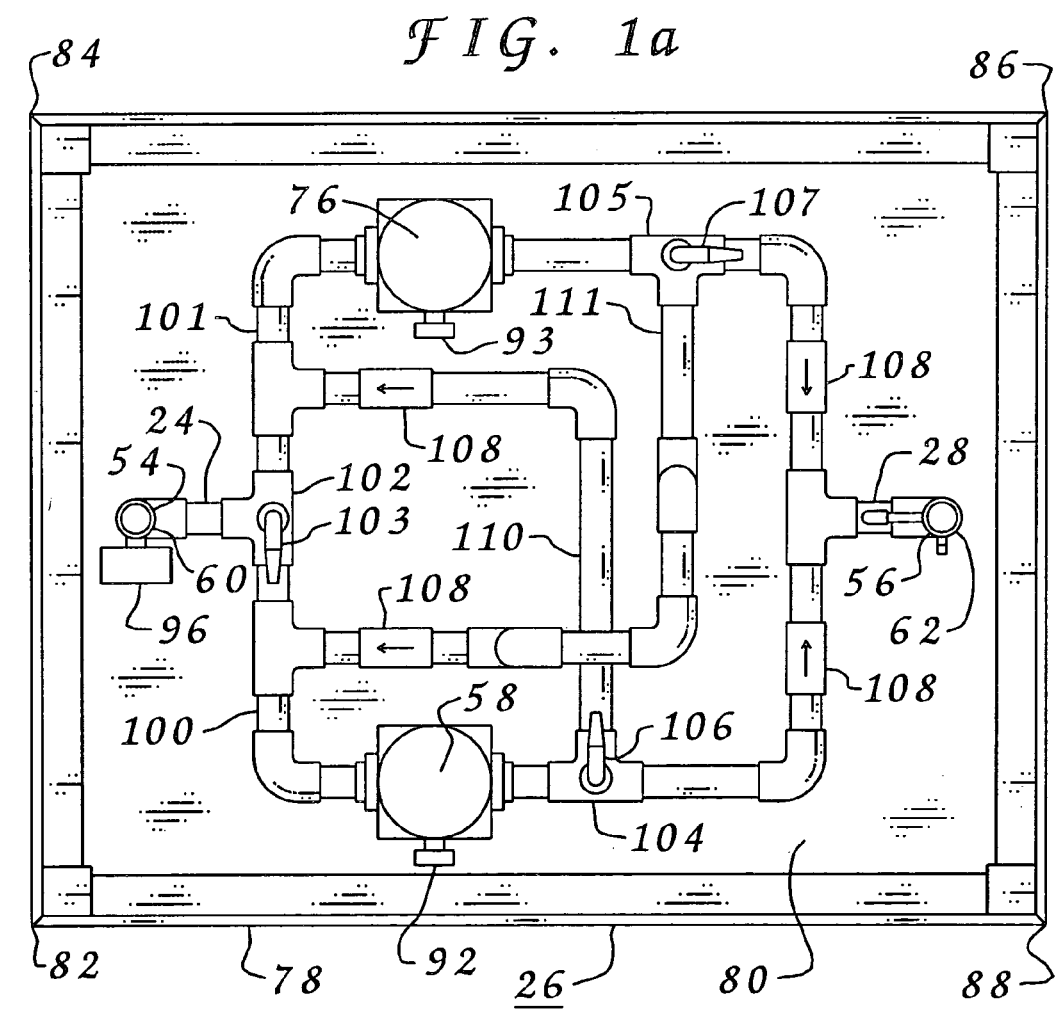
FIG. 1a is a top plan view of a remote filtering station.
Figure 2:
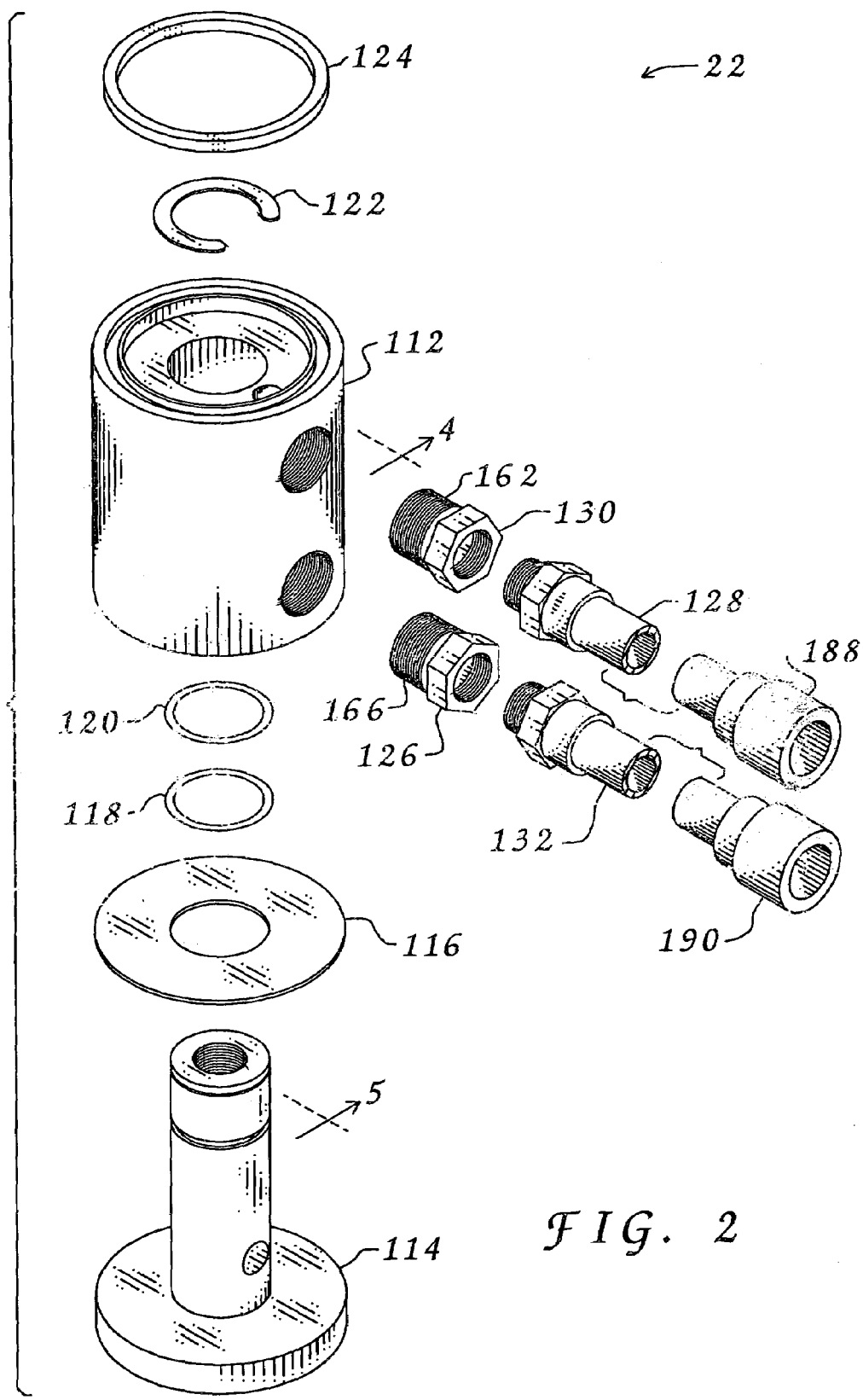
FIG. 2 is an exploded perspective view of a filter replacement adapter.

Filter housing unit 26 has a spill containment perimeter 78, see FIG. 1a and FIG. 1b, to contain any spilled operating fluid. The facing portion of spill containment perimeter 78 has been removed in FIG. 1*b* to reveal the various components positioned therebehind. In the preferred embodiment depicted spill containment perimeter 78 is a continuation of a floor 80 with suitable sealing, such as by welding, at the various corners 82, 84, 86 and 88.

First filter 58 and second filter 76 are positioned within first conduit 24 between first coupling 54 and second coupling 56 of second conduit 28 wherein hydraulic fluid 34 may move through first filter 58, through second filter 76 or through both first filter 58 and second filter 76 in either order as desired by the operator during operation of pumping device 38 of mechanical device 30 during the maintenance filtering of hydraulic fluid 34. First filter 58 and/or second filter 76 of filter housing unit 26 provides for at least a portion of particulate material 90, see FIG. 7*d*, contained in hydraulic fluid 34 to be trapped within first filter 58 of filter housing unit 26 and therefore removed from hydraulic fluid 34 prior to movement to second conduit 28. The means to divert hydraulic fluid 34 from transfer conduit 36 of mechanical device 30 during operation of pumping device 38 of mechanical device 30 to first conduit 24 during the maintenance filtering of hydraulic fluid 34 is performed by filter replacement adapter 22. The means to return hydraulic fluid 34 to transfer conduit 36 of mechanical device 30 during operation of pumping device 38 of mechanical device 30 from second conduit 28 during the maintenance filtering of hydraulic fluid 34 is performed by filter replacement adapter 22.

Filter housing unit 26 further is depicted as having a pressure gauge 92, a pressure gauge 93, means to draw a sample 94, a flow gauge 96, a first filter conduit 100, a second filter conduit 101, a main diversion valve 102, a first filter conduit valve 104, a second filter conduit valve 105, various check valves 108, a second filter diversion conduit 110 and a first filter diversion conduit 111. Pressure gauge 92 provides for a monitoring of a fluid back pressure during the filtering of hydraulic fluid 34 during operation of pumping device 38 of mechanical device 30 passing through first filter 58. Pressure gauge 93 provides for a monitoring of a fluid back pressure during the filtering of hydraulic fluid 34 during operation of pumping device 38 of mechanical device 30 passing through second filter 76. The means to draw sample 94 of hydraulic fluid 34 is depicted as a release valve 98 positioned within second conduit 28. This provides for sample 94 to be taken from downstream side of first filter 58 and second filter 76 of filter housing unit 26. Flow gauge 96 provides for monitoring of a flow rate of hydraulic fluid 34 passing flow gauge 96. Flow gauge 96 is depicted installed in first conduit 24.

Manipulation of a selection handle 103 of main diversion valve 102, manipulation of a selection handle 106 of first filter conduit valve 104 and manipulation of a selection handle 107 of second filter conduit valve 105 permits the operator to select a path of filtering of hydraulic fluid 34. Depending upon the various placements of selection handles 103, 106 and 107 hydraulic fluid 34 may pass only through first filter 58, only through second filter 76, through first filter 58 then through second filter 76 or through second filter 76 then through first filter 58. Second filter diversion conduit 110 extends from first filter conduit valve 104 to second filter conduit 101. First filter diversion conduit 111 extends from second filter conduit valve 105 to first filter conduit 100. Various check valves 108 are positioned in various of the conduits to prevent back flow from entering first filter 58 or second filter 76.

Second filter 76 preferably has characteristics which permit filtering of operating fluid 34 where the filtering qualities of second filter 76 are different from the filtering qualities of first filter 58. In the most preferred embodiment depicted first filter 58 has filtering qualities which remove particulate material 90 from operating fluid 34 while second filter 76 has filtering qualities which remove liquid contaminants, such as water, from operating fluid 34.

Suitable bracing structure, as conventionally known in the art and not depicted in the various views, would be provided to ensure strong and durable integrity of filter housing unit 26 and the various components.

While the versatility of having first filter 58 and second filter 76 positioned on filter housing unit 26 is desirable, it is possible to provide for two (2) distinctly separate filter housing units 26 each having a respective first filter 58 or second filter 76 positioned thereon without any of the complicated valves 102, 104 or 105 or any of the check valves 108 wherein hydraulic fluid 34 enters, passes through the respective filter 58 or 76 and exits. This provides for selection of the filtering qualities desired when a single filtering quality is desired with deployment of the associated filter housing unit 26, or selection of a sequence order when multiple filtering qualities are desired with deployment of both filter housing units 26 in the desired order of connection.

Figure 3:
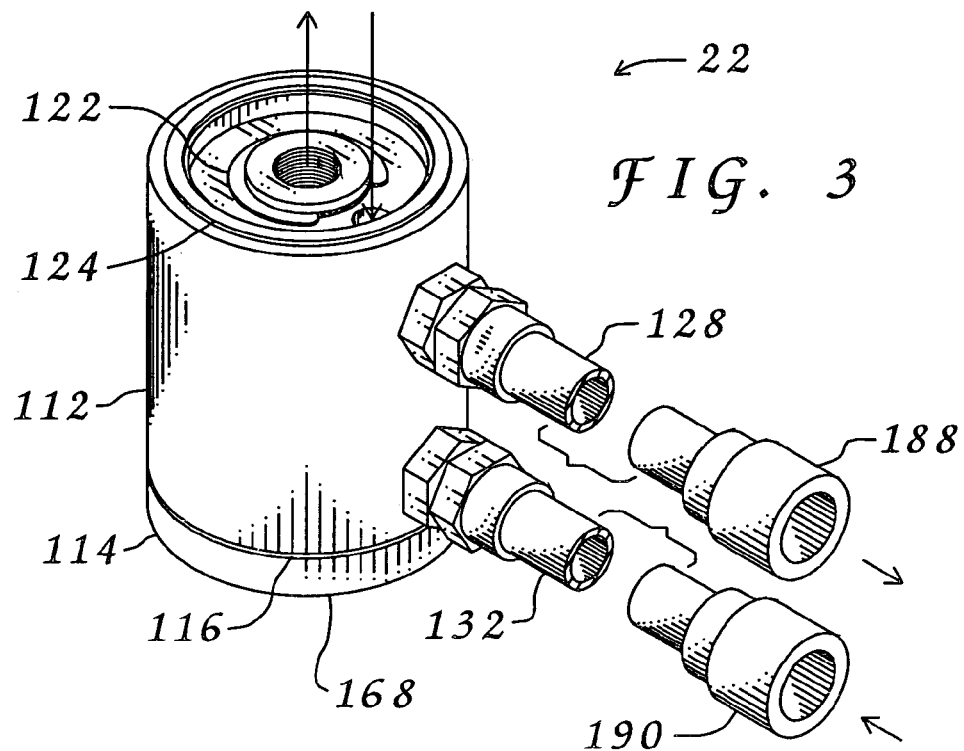
FIG. 3 is a perspective view of the assembled filter replacement adapter depicted in FIG. 2.

Filter replacement adapter 22, specifically see FIG. 3, has means to divert and means to return. Filter replacement adapter 22 replaces, see FIG. 7*c*, filter 48, see FIG. 7*a*, of mechanical device 30 during the maintenance filtering of hydraulic fluid 34.

Referring now specifically to FIG. 2 through FIG. 5, filter replacement adapter 22 is constructed of an outer portion 112, an inner portion 114, a wear plate 116, a lower o-ring seal 118, an upper o-ring seal 120, a snap ring 122, a seal 124, an input fitting 126, a first semi-permanent hose 128, an output fitting 130 and a second semi-permanent hose 132.

Figure 4:
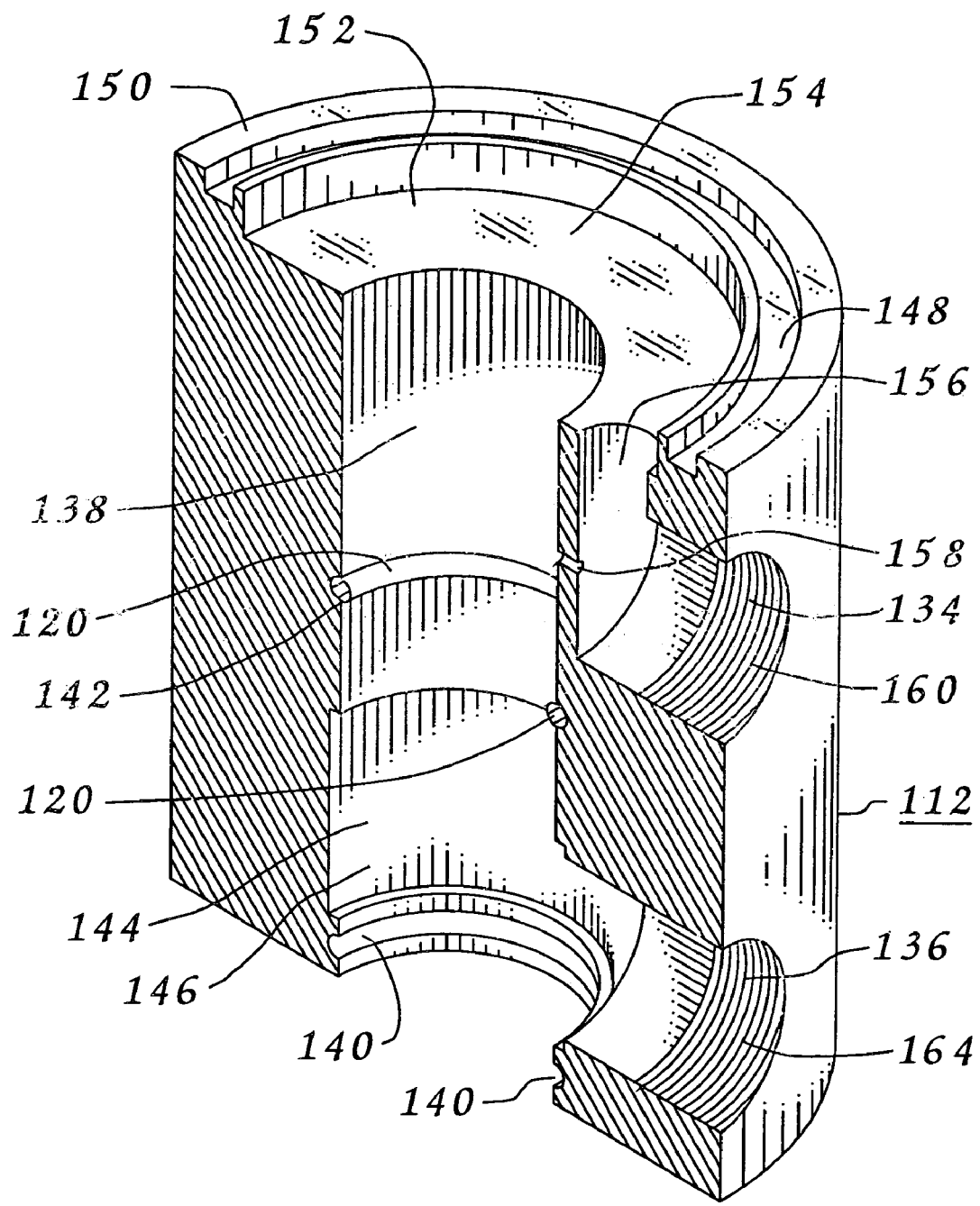
FIG. 4 is a sectional view of an outer portion as taken from the section line '4' in FIG. 2.

Referring now specifically to FIG. 4, outer portion 112 has an output port 134, an input port 136 and a passageway 138 extending therethrough. Passageway 138 has a lower o-ring seating trench 140 and an upper o-ring seating trench 142, with upper o-ring seal 120 positioned therein for clarity of understanding. Passageway 138 has a radial cavity 144 positioned between lower o-ring seating trench 140 and upper o-ring seating trench 142 which partially defines a lower fluid reservoir 146. A seal trench 148 radially surrounds passageway 138 at an upper extent 150 of outer portion 112. Seal trench 148 receives seal 124 therein with a portion of seal 124 extending above seal trench 148. An upper cavity 152 resides between passageway 138 and seal trench 148 which partially defines a top fluid reservoir 154. A flow channel 156 connects output port 134 with upper cavity 152. A pressure release passageway 158 penetrates outer portion 112 from output port 134 to passageway 138 above upper o-ring seating trench 142. Output port 134 has threads 160 therein to receive threads 162, see FIG. 2, of output fitting 130. Input port 136 has threads 164 therein to receive threads 166, see FIG. 2, of input fitting 126. Outer portion 112 preferably is machined from a single piece of material to have the various features as depicted in the various views for the preferred embodiment although many other fabrication methods exist and may be employed.

Figure 5:
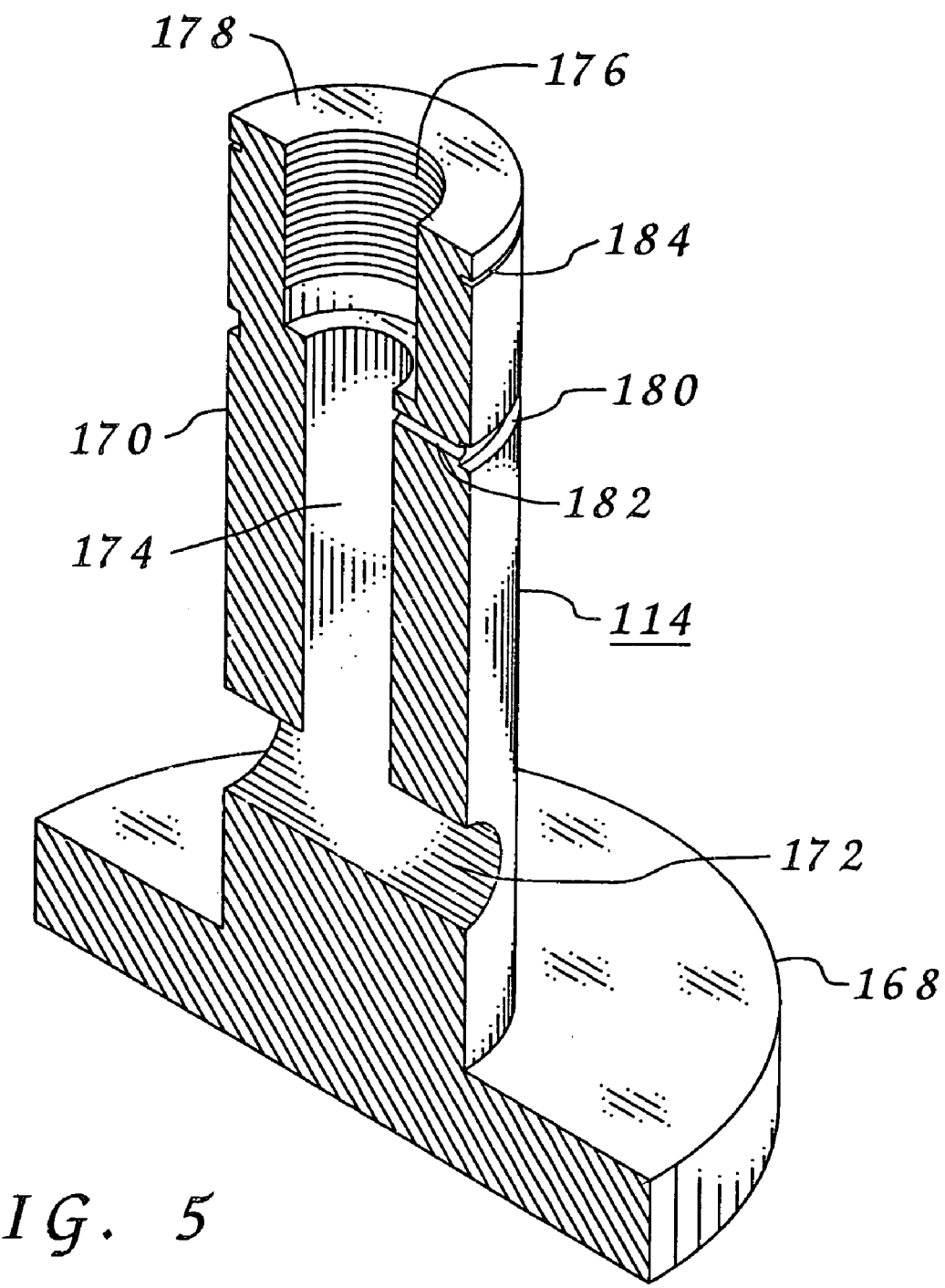
FIG. 5 is a sectional view of an inner portion as taken from the section line '5' in FIG. 2.

Referring now specifically to FIG. 5, inner portion 114 has a base 168 and a shaft 170. A return port 172 penetrates shaft 170 and is in communication with a return flow channel 174 which extends through shaft 170. Inner portion 114 has internal threads 176 at an upper extent 178 of inner portion 114 within return flow channel 174. Internal threads 176 mate with external threads 52 of filter bracket 46, see FIG. 8, of mechanical device 30 during installation of filter replacement adapter 22 on mechanical device 30. Shaft 170 of inner portion 114 has a pressure release reservoir 180 radially extending about shaft 170. A pressure release passageway 182 penetrates shaft 170 from pressure release reservoir 180 to return flow channel 174. A snap ring trench 184 radially surrounds shaft 170 to receive snap ring 122, see FIG. 2 and FIG. 3, to retain inner portion 114 within passageway 138 of outer portion 112. Return port 172 will be in communication with radial cavity 144 of outer portion 112 to further define lower fluid reservoir 146 and permit transfer of fluid through input port 136 of outer portion 112 and through return flow channel 174 of inner portion 114. Inner portion 114 preferably is machined from a single piece of material to have the various features as depicted in the various views for the preferred embodiment although many other fabrication methods exist and may be employed.

Wear plate 116 resides between inner portion 114 and outer portion 112, see FIG. 3, and prevents excessive abrasion between inner portion 114 and outer portion 112. Wear plate 116 preferably is formed from a nylon material which prevents binding therebetween with either inner portion 114 or outer portion 112 thereby reducing any tendency to impart rotation to outer portion 112 from rotational manipulation of inner portion 114.

When operation of pumping device 38 of mechanical device 30 is terminated during the filtering procedure fluid pressure may exist within remote filtering station 20, including first conduit 24, second conduit 28 and filter replacement adapter 22. Pressure release passageway 158 of outer portion 112 of filter replacement adapter 22 cooperates with pressure release reservoir 180 and pressure release passageway 182 of inner portion 114 of filter replacement adapter 22 to equalize pressure where undue leakage of operating fluid 34 does not occur during removal of remote filtering station 20, including filter replacement adapter 22, from mechanical device 30. Due to the small size of pressure release passageways 158 and 182 inconsequential quantities of operating fluid 34 are diverted back to transfer conduit 36 of mechanical device 30 without passing through first filter 58 of filter housing unit 26.

When assembled, see FIG. 3, inner portion 114 is rotatable within passageway 138 of outer portion 112. Such rotation being facilitated by manipulation of base 168 of inner portion 114. This manipulation permitting internal threads 176 of shaft 170 to selectively engage and disengage external threads 52 of filter bracket 46 of mechanical device 30 for installation and removal of filter replacement adapter 22. Upper o-ring seal 120 and lower o-ring seal 118 each contact outer portion 112 and inner portion 114 to prevent passage thereby of fluid contained in either respective lower fluid reservoir 146 or top fluid reservoir 154.

During installation of filter replacement adapter 22 outer portion 112 remains generally axially stationary relative to filter bracket 46 of mechanical device 30. Seal 124 of outer portion 112 mates with a filter contact surface 186, see FIG. 8, of filter bracket 46 of mechanical device 30 following removal of filter 48 from mechanical device 30.

A first semi-permanent hose 128 attaches to output fitting 130 and a second semi-permanent hose 132 attaches to input fitting 126. First hose 128 and second hose 132 may be rigidly attached to outer portion 112 or may be releaseably attached thereto. First semi-permanent hose 128 is part of first conduit 24 while second semi-permanent hose 132 is part of second conduit 28. First semi-permanent hose 128 has a quick connect/release fitting 188 at a terminal end thereof for ready attachment and detachment from second quick connect/release fitting 68 of first extension hose 64. Second semi-permanent hose 132 has a quick connect/release fitting 190 at a terminal end thereof for ready attachment and detachment from second quick connect/release fitting 74 of second extension hose 70.

Of course first extension hose 64 and second extension hose 70 may attach directly to filter replacement adapter 22 in the absence of semi-permanent hoses 128 and 132. Preferably first semi-permanent hose 128 and second semi-permanent hose 132 will be of a sufficient length to provide for ready and easy attachment of first extension hose 64 and second extension hose 70, following installation of filter replacement adapter 22 on mechanical device 30, beyond any surrounding structures of mechanical device 30. If desired, quick connect/release fittings may be installed on filter replacement adapter 22 for ready and easy attachment of first extension hose 64 and second extension hose 70. Filter bracket 46 of mechanical device 30 is well known in the art. Filter mounting shaft 50, see FIG. 8, has a conduit 192 which is part of transfer conduit 36 of mechanical device 30 where operating fluid may be pumped therethrough. Filter bracket 46 also has at least one (1) conduit 194 positioned adjacent filter mounting shaft 50 and which is part of transfer conduit 36 of mechanical device 30 where operating fluid may be pumped therethrough. During routine filtering of the operating fluid during operation of mechanical device 30 the operating fluid is routinely pumped through conduit 194, through filter 48 and through conduit 192 of filter mounting shaft 50. Filter 48 covers and contains conduit 194 to prevent leakage of operating fluid from mechanical device 30 at this portion of filter bracket 46.

It is desirable to bind the various hoses of the present invention together for ease of handling. Additionally, it is desirable to mark the various couplings so that errors in connection may be reduced or eliminated. Various sized filter replacement assemblies may be provided to accommodate all applicable mechanical devices to be serviced. Various pairs of extension hoses may be provided to provide for convenient placement of the filter housing unit during filtering procedures. These pairs may all have a generally equal length or may have unique lengths.

On certain occasions the mechanical device to be service may not be operational or it may be desired to perform the filtering procedure on stored operating fluid. In these instances it is possible to provide a pumping device with the remote filtering station to provide for movement of the operating fluid through the filter of the filter housing unit.

Methods of filtering an operating fluid based upon the present invention will utilize the pumping device of the mechanical device being serviced to move the operating fluid during the filtering procedure.

Figure 6:
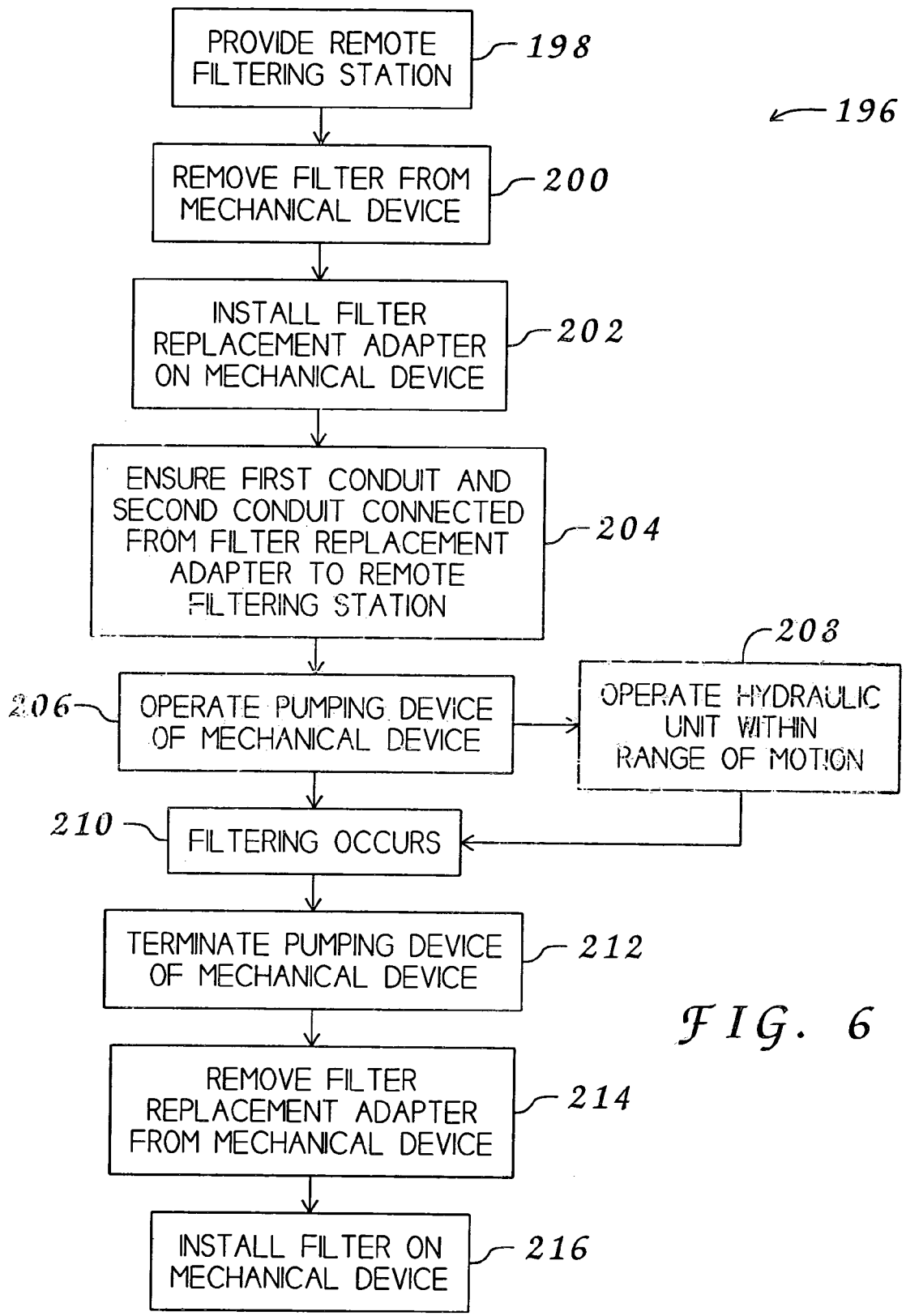
FIG. 6 is a flow chart of a method of filtering.

FIG. 6 depicts a method of filtering 196 comprising various steps. 'Provide remote filtering station' 198 is performed where an embodiment of a device capable of performing the filtering procedure is provided. 'Remove filter from mechanical device' 200 is performed where an applicable existing filter is removed from the mechanical device. 'Install filter replacement adapter on mechanical device' 202 is performed where an embodiment of a device having features described elsewhere herein is installed in place of the previously removed existing filter on the mechanical device. 'Ensure first conduit and second conduit connected from filter replacement adapter to remote filtering station' 204 is performed. Such connection may already exist or such connection must then be made at this point in the method.

'Operate pumping device of mechanical device' 206 is performed where the operating fluid to be filtered of the mechanical device is circulated. If applicable, 'operate hydraulic unit within range of motion' 208 is performed to flush any stagnant operating fluid contained therein out and into the steam of operating fluid moving through or toward the provided remote filtering station. Preferably each hydraulic unit will be operated through a respective range of motion twice. Most preferably all such hydraulic units will be operated through their respective range of motions once then the entire process will be repeated where two (2) complete series of operations of the deployed hydraulic units are performed in sequence. At this point preferably each existing hydraulic unit on the mechanical device is so operated to flush any stagnant operating fluid therefrom. At this point in the method 'filtering occurs' 210 occurs. Various criteria may be utilized to determine when to proceed from this step to the next step with the goal being to provide adequate filtering of the operating fluid to meet predetermined standards. 'Terminate pumping device of mechanical device' 212 is performed to end the filtering of the operating fluid. Such termination ending the powered movement of the operating fluid through the remote filtering station. 'Remove filter replacement adapter from mechanical device' 214 is performed where the filter replacement adapter is removed. 'Install filter on mechanical device' 216 is performed where the existing filter is replaced, or, more preferably, a new filter is installed on the mechanical device.

FIG. 7*a* through FIG. 7*d* depict a standard filtering procedure based upon the present invention. Filter housing unit 26 is positioned in a convenient location relative to mechanical device 30. Filter 48 of mechanical device 30 is removed from filter bracket 46, see change from FIG. 7*a* to FIG. 7*b*. Then filter replacement adapter 22 is installed on filter bracket 46 of mechanical device 30, see FIG. 7*c*. Then first extension hose 64 and second extension hose 70 are installed to connect filter replacement adapter 22 and filter housing unit 26, see FIG. 7*c*. Of course, due to the easy, non-rotational, installation capability of filter replacement adapter 22, first extension hose 64 and second extension hose 70 may already be attached to filter replacement adapter 22. This arrangement is particularly desirable when multiple mechanical devices 30 are to be serviced at a common location. Then pumping device 38 of mechanical device 30 is operated to move operating fluid 34 through first filter 58 of filter housing unit 26, see FIG. 7*c*. During the filtering of operating fluid 34 any hydraulic units 40 will be operated through their respective range of motion, see change from FIG. 7*c* to FIG. 7*d* and back. Following completion of the filtering of operating fluid 34 operation of pumping device 38 of mechanical device 30 is terminated. Then filter replacement adapter 22 is removed from filter bracket 46 of mechanical device 30. If desired extension hoses 64 and 70 may be removed before or after removal of filter replacement adapter 22. Then filter 48, or a new filter, is installed on filter bracket 46 of mechanical device 30.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of filtering an operating fluid contained in a mechanical device, the mechanical device having a pumping device to provide for a movement of the operating fluid about the mechanical device at least partially within a transfer conduit of the mechanical device and a filter bracket in communication with the transfer conduit of the mechanical device and wherein the mechanical device further comprises a filter connected to the filter bracket of the mechanical device, the method of filtering utilizing the pumping device of the mechanical device for movement of the operating fluid, the method comprising the steps of:

a) providing a remote filtering station having:
1) a filter;
2) a first conduit for fluid transfer to the remote filtering station;
3) a second conduit for fluid transfer from the remote filtering station;
4) a filter replacement adapter having an outer portion, the outer portion of the filter replacement adapter having a first passageway and a second passageway extending therethrough for communication with the first conduit and the second conduit respectively and wherein the outer portion of the filter replacement adapter may remain axially stationary during installation and removal of the filter replacement adapter;

b) removing the filter of the mechanical device from the filter bracket of the mechanical device;

c) attaching the filter replacement adapter to the filter bracket of the mechanical device subsequent to removing the filter of the mechanical device;

d) connecting the first conduit relative to the first passageway of the filter replacement adapter for communication with the filter bracket of the mechanical device and therefore the transfer conduit of the mechanical device for the fluid transfer of the operating fluid from the transfer conduit of the mechanical device to the first conduit;

e) connecting the second conduit relative to the second passageway of the filter replacement adapter for communication with the filter bracket of the mechanical device and therefore the transfer conduit of the mechanical device downstream of the connection of the first conduit to the transfer conduit of the mechanical device for the fluid transfer of the operating fluid from the second conduit to the transfer conduit of the mechanical device;

f) operating the pumping device of the mechanical device to move the operating fluid through the transfer conduit of the mechanical device and into the first conduit and through the filter of the remote filtering station and through the second conduit and into the transfer conduit of the mechanical device;

g) disconnecting the first conduit from the connection relative to the transfer conduit of the mechanical device;

h) disconnecting the second conduit from the connection relative to the transfer conduit of the mechanical device.

2. The method defined in claim 1 wherein the operating fluid is a hydraulic fluid.

3. The method defined in claim 2 wherein the mechanical device further comprises a hydraulic unit capable of being operated through a range of motion in response to movement of the hydraulic fluid through the transfer conduit of the mechanical device utilizing the pumping device of the mechanical device and wherein the method further comprises operating the hydraulic unit generally through the range of motion during at least a portion of the filtering of the hydraulic fluid.

4. The method defined in claim 1 wherein the provided filter replacement adapter further comprises a tightening portion and wherein the tightening portion at least partially penetrates the outer portion during attachment to the filter bracket of the mechanical device and wherein at least a portion of the tightening portion is rotated during attachment of the filter replacement adapter to the filter bracket of the mechanical device.

5. The method defined in claim 1 wherein the provided filter replacement adapter further comprises a quick connect/release fittings associated with the first conduit and a quick connect/release fittings associated with the second conduit.

6. The method defined in claim 5 wherein the provided filter replacement adapter further comprises a length of conduit separating the filter replacement adapter from the quick connect/release fittings associated with the first conduit and a length of conduit separating the filter replacement adapter from the quick connect/release fittings associated with the second conduit.

7. A method of filtering a hydraulic fluid contained in a mechanical device, the mechanical device having a pumping device, a filter bracket and a filter, the filter of the mechanical device connected to the filter bracket of the mechanical device, the pumping device of the mechanical device to provide for a movement of the hydraulic fluid about the mechanical device at least partially within a transfer conduit of the mechanical device, the filter bracket of the mechanical device in communication with the transfer conduit of the mechanical device wherein the hydraulic fluid pumped by the pumping device of the mechanical device routinely passes through the filter bracket of the mechanical device through the filter of the mechanical device and back through the filter bracket of the mechanical device, the method of filtering utilizing the pumping device of the mechanical device for movement of the hydraulic fluid, the method comprising the steps of:
  a) providing a remote filtering station having:
    1) a filter;
    2) a filter replacement adapter having an outer portion, the outer portion of the filter replacement adapter having a first passageway and a second passageway extending therethrough wherein the outer portion of the filter replacement adapter may remain axially stationary during installation and removal of the filter replacement adapter;
    3) a first conduit to provide for containment of the hydraulic fluid during at least a portion of a fluid transfer from the first passageway of the filter replacement adapter to the filter;
    4) a second conduit to provide for containment of the hydraulic fluid during at least a portion of a fluid transfer from the filter to the second passageway of the filter replacement adapter;
  b) removing the filter of the mechanical device from the filter bracket of the mechanical device of the mechanical device;
  c) attaching the filter replacement adapter to the filter bracket of the mechanical device wherein the hydraulic fluid pumped by the pumping device of the mechanical device passes through the filter replacement adapter;
  d) operating the pumping device of the mechanical device to move the hydraulic fluid through the transfer conduit of the mechanical device and through the outer portion of the filter replacement adapter and into the first conduit and through the filter and through the second conduit and into the outer portion of the filter replacement adapter and to the transfer conduit of the mechanical device wherein the hydraulic fluid is filtered by the filter;
  e) removing the filter replacement adapter from the filter bracket of the mechanical device;
  f) attaching a filter of the mechanical device to the filter bracket of the mechanical device.

8. The method defined in claim 7 further comprising providing a pressure gauge to provide for monitoring of a fluid back pressure during the filtering of the hydraulic fluid during the operation of the pumping device of the mechanical device.

9. The method defined in claim 7 further comprising providing means to draw a sample of the hydraulic fluid from a downstream side of the filter of the remote filtering station during the filtering of the hydraulic fluid during operation of the pumping device of the mechanical device.

10. The method defined in claim 7 further comprising providing a flow gauge to provide for monitoring of a flow rate of the hydraulic fluid during the filtering of the hydraulic fluid during operation of the pumping device of the mechanical device.

11. The method defined in claim 7 wherein the provided remote filtering station further comprises a second filter to provide for subsequent filtering of the hydraulic fluid following the filtering of the hydraulic fluid by the filter of the remote filtering station during the filtering of the hydraulic fluid during operation of the pumping device of the mechanical device.

12. A remote filtering station to provide for a maintenance filtering of a hydraulic fluid of a mechanical device, the mechanical device having a hydraulic fluid pumping device to circulate the hydraulic fluid through a transfer conduit of the mechanical device under pressure during operation of the hydraulic fluid pumping device of the mechanical device, the remote filtering station comprising:
  a) a first conduit to provide for containing the hydraulic fluid during transit from the mechanical device during operation of the hydraulic fluid pumping device of the mechanical device into the remote filtering station during the maintenance filtering of the hydraulic fluid;
  b) a second conduit to provide for containing the hydraulic fluid during transit to the mechanical device during operation of the hydraulic fluid pumping device of the mechanical device from the remote filtering station during the maintenance filtering of the hydraulic fluid;
  c) a filter positioned between the first conduit and the second conduit wherein the hydraulic fluid moves through the filter of the remote filtering station during operation of the hydraulic fluid pumping device of the mechanical device during the maintenance filtering of the hydraulic fluid, the filter of the remote filtering station to provide for at least a portion of particulate matter contained in the hydraulic fluid to be trapped within the filter of the remote filtering station and therefore removed from the hydraulic fluid prior to movement to the second conduit;
  d) a filter replacement adapter to replace a filter of the mechanical device during the maintenance filtering of the hydraulic fluid, the filter replacement adapter further comprising an outer portion and an inner portion, the outer portion remaining generally axially stationary during installation on the mechanical device, the inner portion to penetrate the outer portion during installation on the mechanical device, at least a portion of the inner portion rotatable during installation on the mechanical device, the outer portion of the filter replacement adapter having a first passageway and a second passageway extending therethrough;

e) means to divert the hydraulic fluid from the transfer conduit of the mechanical device utilizing the first passageway of the outer portion of the filter replacement adapter during operation of the hydraulic fluid pumping device of the mechanical device to the first conduit during the maintenance filtering of the hydraulic fluid;

f) means to return the hydraulic fluid to the transfer conduit of the mechanical device utilizing the second passageway of the outer portion of the filter replacement adapter during operation of the hydraulic fluid pumping device of the mechanical device from the second conduit during the maintenance filtering of the hydraulic fluid.

13. The remote filtering station defined in claim 12 wherein the inner portion of the filter replacement adapter further comprises a tightening shaft having internal threads to mate with a filter mounting shaft of the mechanical device, the filter mounting shaft of the mechanical device having external threads.

14. The remote filtering station defined in claim 12 wherein the outer portion of the filter replacement adapter has a first semi-permanent hose extending therefrom and a second semi-permanent hose extending therefrom, the first semi-permanent hose to connect with the first conduit of the remote filtering station during the maintenance filtering of the hydraulic fluid, the second semi-permanent hose to connect with the second conduit of the remote filtering station during the maintenance filtering of the hydraulic fluid.

15. The remote filtering station defined in claim 14 wherein the first semi-permanent hose has a quick connect/release fitting for ready attachment and detachment from the first conduit of the remote filtering station during the maintenance filtering of the hydraulic fluid, and wherein the second semi-permanent hose has a quick connect/release fitting for ready attachment and detachment from the second conduit of the remote filtering station during the maintenance filtering of the hydraulic fluid.

16. The remote filtering station defined in claim 12 wherein the mechanical device has a hydraulic unit powered by hydraulic fluid displaced through the transfer conduit of the mechanical device under pressure by the hydraulic fluid pumping device of the mechanical device and wherein the hydraulic unit is operated generally through a range of motions during the maintenance filtering of the hydraulic fluid of the mechanical device.

* * * * *